(No Model.)

E. B. BARKER.
PHOTOGRAPHIC SHUTTER.

No. 440,583. Patented Nov. 11, 1890.

WITNESSES:
C. F. Smith
G. W. Borsham

INVENTOR
Erastus B. Barker
BY Phillips Abbott
his ATTORNEY

UNITED STATES PATENT OFFICE.

ERASTUS B. BARKER, OF NEWARK, NEW JERSEY.

PHOTOGRAPHIC SHUTTER.

SPECIFICATION forming part of Letters Patent No. 440,583, dated November 11, 1890.

Application filed July 19, 1890. Serial No. 359,242. (No model.)

*To all whom it may concern:*

Be it known that I, ERASTUS B. BARKER, a citizen of the United States, and a resident of Newark, in the county of Essex and State of New Jersey, have invented certain new and useful Improvements in Photographic Shutters, of which the following is a specification.

My invention relates to an improved form of shutter for photographic cameras; and it consists in the construction of the parts and their coactive relation, hereinafter set forth.

Figure 1:
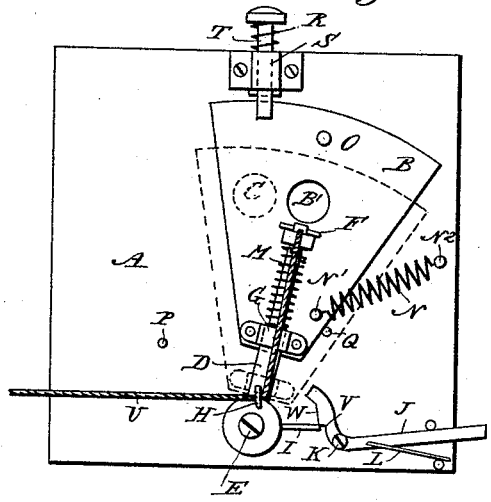
Figure 2:
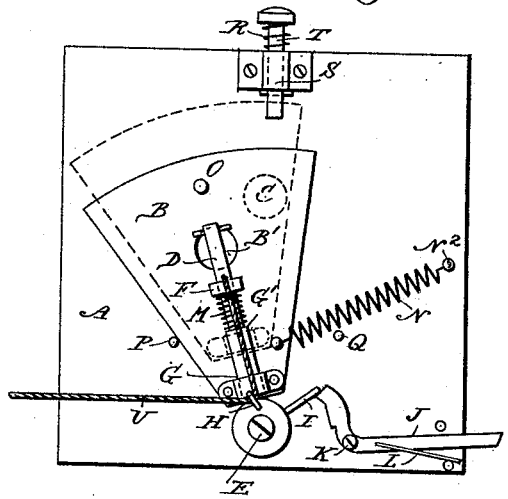
Figure 3:
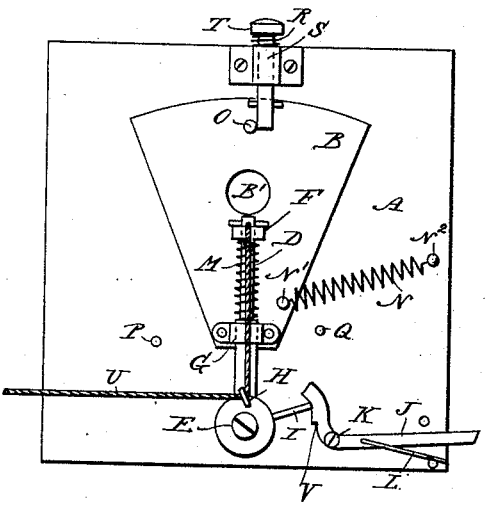
Figure 4:
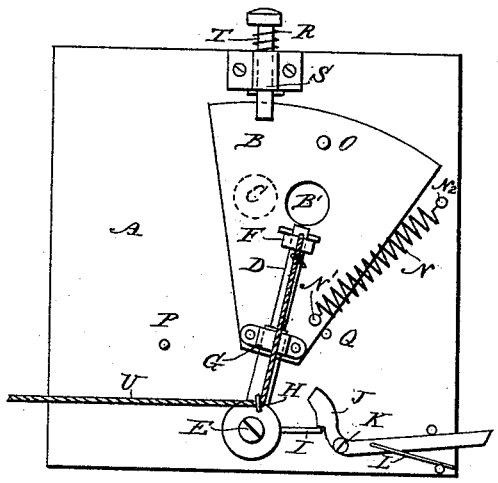
Figure 5:
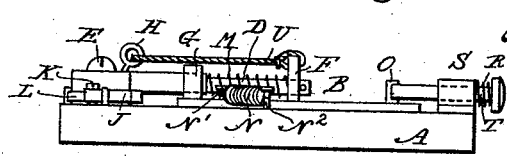

Figure 1 illustrates an elevation of the invention, showing the parts in position prior to being set. Fig. 2 illustrates a like view, the shutter being set ready for an exposure. Fig. 3 illustrates the position of the parts in position for a time exposure. Fig. 4 illustrates an alternative construction of the shutter. Fig. 5 illustrates an edgewise view of the parts as shown in Fig. 3.

A is the base-board, to which the shutter mechanism is attached. The end of the camera or any suitable support for the several devices may be used; but I prefer a separate support, as shown, which may itself be attached to the camera.

B is the shutter. It is provided with an exposure-aperture B', which may be of the same size as the exposure-aperture C in the base A or camera-front or of different size, as preferred.

D is a spindle, preferably of metal, which is pivoted at E to the base or its equivalent. The shutter is attached to the spindle by clips F and G, and they are of such size that the shutter can easily slide on the spindle.

H is a ring or eyelet fastened to the spindle near the pivot E, and I is a pin or finger extending laterally from the hub of the spindle.

J is the retaining-latch. It is pivoted at K to the base or its equivalent and is spring-actuated by spring L.

M is a spring, which preferably, but not necessarily, embraces the spindle and abuts at one end against the clip F and at the other against a shoulder G', (see Fig. 2,) made on the spindle.

N is another spring, which is attached to the shutter at N' and to a pin or equivalent fastening device N², fastened to the base.

O is a stop attached to or made on the shutter, and P and Q are two other stops attached to the base or its equivalent, which regulate the extent of lateral movement of the shutter.

R is a pin adapted to slide through a clip S, attached to the base. It is normally projected by a spring T. U is a cord or its equivalent, which is attached to the forward clip F and passes thence through the eye H, and thence off laterally to the outside of the camera, where it may be laid hold of.

The latch J has three bearing-surfaces, which during the operation of the apparatus engage with the finger I for the control of the movement of the shutter. They are marked, respectively, V, W, and W'. (See Fig. 1.)

The operation is as follows: Assuming that the parts are in the position shown in Fig. 1, to set the shutter the cord U is pulled upon, and because the finger I is resting against the surface V of the latch J there is resistance to the lateral swinging of the shutter because of the spring L. Consequently the pull on the cord causes the shutter to slide down the spindle D, compressing the spring M. Thus the exposure-aperture B' in the shutter is moved out of the arc of coincidence with the exposure-aperture C. Finally, the resistance of the spring M to further compression is so great, or because the spring becomes fully compressed, that the parts assume the position shown in dotted lines in Fig. 1. Further pulling on the cord U then overcomes the resiliency of the spring L, and the shutter swings from the position shown in Fig. 1 to that shown in Fig. 2, the exposure-aperture B passing at one side of the aperture C, and the finger I attains the position shown in Fig. 2, in which it rests against the end surface W' of the latch J. The cord is then released and the parts assume the position shown in dotted lines in Fig. 2. Upon now tripping the latch it will be seen that the spring N will sweep the shutter across from left to right, making an instantaneous exposure during the time of coincidence of the apertures B' and C. To make a time exposure, the pin R is pressed in and held by the hand of the operator or by any suitable holding device. (Not shown.) The stop O on the shutter then comes in contact with the pin R, and the two exposure-apertures are held in coincidence with each other so long as may be desired, as shown in Fig. 3.

In Fig. 4 I show an alternative construction. In it I employ the spring N, only doing away with the spring M; but I change the location of the attachment N², so that the spring N acts in the dual capacities of both of the springs M and N in the other forms.

It will be obvious to those who are familiar with this art that various modifications may be made in the details of construction and still the essentials of my invention be employed. I do not, therefore, limit myself to such details.

I claim—

1. In a photographic-shutter mechanism, a shutter adapted to a rotary movement about a pivot or center and a movement toward and from the center, substantially as set forth.

2. The combination, in shutter mechanism, of a shutter adapted to a rotary movement about a center, a movement toward and from the center, and a latch constructed and arranged to hold the shutter in its set position, and also at about half-transit for a time exposure, substantially as set forth.

3. The combination, in a shutter mechanism, of a pivoted spindle, a shutter longitudinally movable thereon, a spring to swing the shutter, a latch to hold the shutter against the action of the spring, and a stop to limit the lateral movement of the shutter, substantially as set forth.

4. The combination, in a shutter mechanism, of a pivoted spindle, a shutter longitudinally movable thereon, a spring to swing the shutter, a pin to stop the shutter at about half-transit, and a latch to hold the shutter against the action of the spring, substantially as set forth.

5. The combination, in a shutter mechanism, of a pivoted spindle, a shutter longitudinally movable on the spindle, a spring to project the shutter on the spindle, and a cord to retract it, substantially as set forth.

6. In a shutter mechanism, a pivoted shutter constructed and arranged to move about a center on circles having different radii, substantially as set forth.

7. The combination of a pivoted shutter constructed and arranged to have motion toward and from its pivot at the extremes of its movement and a rotary movement about its pivot on arcs of different radii while being set and which operates for an exposure, and a latch to hold the shutter in its set position, substantially as set forth.

Signed at New York, in the county of New York and State of New York, this 17th day of July, A. D. 1890.

ERASTUS B. BARKER.

Witnesses:
JOHN H. HEATH,
WILLIAM CLEVERLEY.